(12) United States Patent
Hart et al.

(10) Patent No.: US 12,743,530 B2
(45) Date of Patent: Sep. 22, 2026

(54) FRAMEWORK FOR MIGRATION DATA DISCOVERY

(71) Applicant: HARTFORD FIRE INSURANCE COMPANY, Hartford, CT (US)

(72) Inventors: Julia E Hart, East Windsor, CT (US); Louis Francis Neal, Philadelphia, PA (US); William L Cooper, Port St Joe, FL (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 116 days.

(21) Appl. No.: 18/924,356

(22) Filed: Oct. 23, 2024

(65) Prior Publication Data

US 2026/0111574 A1 Apr. 23, 2026

(51) Int. Cl.
*G06F 21/60* (2013.01)
*G06F 21/62* (2013.01)

(52) U.S. Cl.
CPC ........ *G06F 21/604* (2013.01); *G06F 21/6227* (2013.01)

(58) Field of Classification Search
CPC ........................... G06F 21/604; G06F 21/6227
See application file for complete search history.

(56) References Cited

U.S. PATENT DOCUMENTS 7,343,377 B1 * 3/2008 van Opdorp ........ G06F 16/2365 707/999.102
7,647,398 B1 * 1/2010 Fan ...................... G06Q 10/107 709/224
7,703,021 B1 * 4/2010 Flam ................... G06F 21/6227 715/741
7,877,399 B2 * 1/2011 Lwo ...................... G06F 40/194 707/811
8,606,756 B2 * 12/2013 Lauer .................. G06F 16/2471 707/661
8,819,068 B1 * 8/2014 Knote ................. G06F 16/2282 707/790
8,843,448 B1 * 9/2014 MacNeill ............. G06F 16/119 707/669

(Continued)

FOREIGN PATENT DOCUMENTS

WO WO-2024137688 A1 * 6/2024 ........... G06F 16/214

*Primary Examiner* — Aravind K Moorthy
(74) *Attorney, Agent, or Firm* — Buckley, Maschoff & Talwalkar LLC

(57) ABSTRACT

According to some embodiments, systems and methods are provided including. receiving a request for information about a table, the request including a requested table name; determining whether a corresponding table exists for the requested table name, the determination based on a comparison of the requested table name to a first schema including the one or more schema table names, wherein the schema represents tables migrated to a cloud computing environment; identifying an access role in a case the corresponding table exists; and generating a view in response to the determination, wherein the view shows one of: a) a database, a schema and a table name for each table, in a case the corresponding table exists, or b) an indication the requested table name is not migrated to the cloud environment, in a case the corresponding table does not exist. Numerous other aspects are provided.

20 Claims, 9 Drawing Sheets

(56) References Cited

U.S. PATENT DOCUMENTS 9,037,609 B1 * 5/2015 Tibbitts ............... G06F 16/3334 707/783
9,075,843 B2 * 7/2015 Gimbel ............. G06F 16/24547
9,229,942 B1 * 1/2016 MacNeill .............. G06F 16/119
9,317,574 B1 * 4/2016 Brisebois .............. G06F 16/254
9,569,626 B1 * 2/2017 Brisebois .............. H04W 12/02
9,842,218 B1 * 12/2017 Brisebois .............. H04L 63/101
10,078,758 B1 * 9/2018 Hanna ................. G06F 21/6227
10,248,810 B2 * 4/2019 Bisaga .................... G06F 21/62
10,395,293 B1 * 8/2019 Mangtani ........... G06Q 30/0623
10,410,013 B2 * 9/2019 Weissman ............. G06F 16/176
10,509,696 B1 * 12/2019 Gilderman .......... G06F 11/0727
11,003,783 B1 * 5/2021 Ursachi ................. G06F 21/602
11,055,352 B1 * 7/2021 Beitchman ........ G06F 16/90335
11,086,842 B1 * 8/2021 Lieberman ............ H04L 51/046
11,138,164 B1 * 10/2021 Munuhur Rajagopal ................... G06F 16/213
11,153,394 B1 * 10/2021 Eberlein ................. H04L 67/61
11,334,499 B2 5/2022 Evans
11,567,912 B1 * 1/2023 Bengoa ............... G06F 16/2282
11,570,182 B1 * 1/2023 Tran .................... G06F 21/6227
11,630,813 B1 * 4/2023 Plenderleith .......... G06F 16/215 707/609
11,762,978 B1 * 9/2023 Chintala ................. G06F 21/44
11,789,911 B1 * 10/2023 Surabhi ................. G06F 16/256 707/802
11,841,970 B1 * 12/2023 Fan ......................... G06F 21/31
11,899,636 B1 * 2/2024 Verma ................. G06F 16/2358
12,147,400 B1 * 11/2024 Sanders .................. G06F 16/27
12,147,555 B1 * 11/2024 Zaharia ................. G06F 21/602
12,197,458 B1 * 1/2025 Owen ................. G06F 21/6245
12,223,065 B1 * 2/2025 Fathalla ................ G06F 21/604
12,265,801 B1 * 4/2025 Geigel .................. G06F 3/0486
12,321,605 B2 * 6/2025 Gavali .................... G06F 3/067
12,367,314 B1 * 7/2025 Bogatov ............. G06F 21/6254
12,406,074 B1 * 9/2025 Bhatt ...................... G06F 21/44
12,411,844 B1 * 9/2025 Krishna ............... G06F 16/3329
12,417,305 B1 * 9/2025 Ponomarenko ..... G06F 21/6227
12,437,100 B1 * 10/2025 Bogatov ............. G06F 21/6227
12,481,447 B1 * 11/2025 Cosentino ............. G06F 3/0607
12,579,137 B2 * 3/2026 Xu .................... G06F 16/24522
2001/0049747 A1 * 12/2001 Stanbach ............ H04L 61/4511 707/E17.116
2002/0010794 A1 * 1/2002 Stanbach, Jr. .......... H04L 67/53 707/E17.116
2002/0099710 A1 7/2002 Papierniak
2005/0050046 A1 * 3/2005 Puz .................... G06F 21/6227 707/999.009
2005/0192989 A1 * 9/2005 Adiba ................... G06F 16/273
2005/0234985 A1 * 10/2005 Gordon ................ G11B 27/105
2006/0206485 A1 * 9/2006 Rubin ................. G06F 21/6227 707/999.009
2006/0265385 A1 * 11/2006 Agrawal .............. G06F 16/256
2007/0005596 A1 * 1/2007 Brown .................... G06F 16/20
2007/0079140 A1 * 4/2007 Metzger .............. G06F 21/6245 713/189
2007/0220022 A1 * 9/2007 Lankinen .............. G06F 16/258
2007/0276835 A1 * 11/2007 Murthy ............... G06F 21/6227 707/999.009
2007/0294307 A1 * 12/2007 Chen ....................... G06F 16/22
2008/0052291 A1 * 2/2008 Bender ............... G06F 21/6227 707/999.009
2008/0071825 A1 * 3/2008 Guo ........................ G06F 16/48
2008/0120351 A1 * 5/2008 Khaladkar .............. G06F 16/80
2008/0189758 A1 * 8/2008 Akeel ................. G06F 21/6227 726/1
2008/0263652 A1 * 10/2008 McMurtry ............ G06F 21/335 726/5
2009/0157725 A1 * 6/2009 Zheng .................. G06F 40/226 707/E17.127
2009/0164943 A1 * 6/2009 Ryan ....................... G06F 16/20 715/810
2010/0094902 A1 * 4/2010 Vyvyan .................. G06F 16/27 713/168
2010/0138398 A1 * 6/2010 Yoshizawa ............. G06F 16/23 707/812
2010/0250746 A1 * 9/2010 Murase ............... G06F 11/3433 711/E12.001
2011/0099515 A1 * 4/2011 Doney .................. G06F 16/219 715/810
2012/0023143 A1 * 1/2012 Bolohan ............... G06F 16/213 707/E17.005
2012/0054223 A1 * 3/2012 Konik ..................... G06F 16/21 707/769
2012/0296884 A1 * 11/2012 Bolohan ............... G06F 16/219 707/E17.005
2012/0311672 A1 * 12/2012 Connor .................. H04L 63/10 726/4
2012/0331013 A1 * 12/2012 Vickers .................. G06F 16/25 707/804
2013/0085991 A1 * 4/2013 Welden ................ G06F 16/213 707/634
2013/0110967 A1 * 5/2013 Ueoka .................. G06F 16/185 709/214
2013/0173651 A1 * 7/2013 Probasco ............ H04L 41/0806 707/769
2013/0347127 A1 * 12/2013 Vedabrata ........... G06F 21/6227 726/28
2014/0101299 A1 * 4/2014 Cherel .................... G06F 9/468 709/223
2014/0143011 A1 * 5/2014 Mudugu ............ G06Q 10/0635 705/7.28
2014/0164318 A1 * 6/2014 Tsai ..................... G06F 16/958 707/609
2014/0214886 A1 * 7/2014 Annapragada .... G06F 16/24542 707/769
2014/0304505 A1 * 10/2014 Dawson .............. G06F 21/6227 713/165
2015/0169757 A1 * 6/2015 Kalantzis ............. G06F 16/213 707/722
2015/0205951 A1 * 7/2015 Anand .................... G06F 21/52 707/700
2015/0235143 A1 * 8/2015 Eder ...................... G16Z 99/00 706/12
2015/0248404 A1 * 9/2015 Pazdziora ............ G06F 16/214 707/809
2016/0062555 A1 * 3/2016 Ward ...................... G06F 40/14 715/778
2016/0210470 A1 * 7/2016 Rozenberg .......... G06F 21/6227
2016/0217169 A1 * 7/2016 Elias ................... G06F 21/6227
2016/0232362 A1 * 8/2016 Conway ............. G06F 21/6227
2016/0342813 A1 * 11/2016 Kakii .................... G06F 21/604
2017/0068819 A1 * 3/2017 Anand .................. G06F 21/577
2017/0076109 A1 * 3/2017 Kaditz .................. G16H 40/20
2017/0083579 A1 * 3/2017 Du .......................... H04L 67/10
2017/0091446 A1 * 3/2017 Bendel .................. G06F 16/178
2017/0364555 A1 * 12/2017 Sirigireddy ....... G06F 16/24534
2017/0371902 A1 * 12/2017 Zellweger ........... G06F 16/2282
2018/0024701 A1 * 1/2018 Sanches ............... G06F 16/172 715/781
2018/0041580 A1 * 2/2018 Kadowaki ............... G06F 3/061
2018/0060365 A1 * 3/2018 Mujumdar ............ G06F 16/211
2018/0063089 A1 * 3/2018 Moysi ................ G06F 16/2456
2018/0165469 A1 * 6/2018 Ks ...................... G06F 21/6227
2018/0165470 A1 * 6/2018 Nachenberg .......... H04L 9/0897
2018/0189330 A1 * 7/2018 Doan ................. G06F 16/2282
2018/0329757 A1 * 11/2018 Patgar ................. G06F 9/45558
2019/0036902 A1 * 1/2019 Hara ..................... H04L 63/083
2019/0087835 A1 * 3/2019 Schwed ............. G06F 21/6227
2019/0095244 A1 * 3/2019 Eda ..................... H04L 67/1097
2019/0104129 A1 * 4/2019 Iqbal ..................... H04L 63/102
2019/0156052 A1 * 5/2019 Paya ................... G06F 21/6218
2019/0158513 A1 * 5/2019 Shtar ..................... G06F 21/552
2019/0188198 A1 * 6/2019 Okajima ................. G06F 17/10
2019/0227949 A1 * 7/2019 Bernat ................ G06F 11/3476
2019/0272387 A1 * 9/2019 Gkoulalas-Divanis ...................... G06F 21/604
2019/0392056 A1 * 12/2019 Sugeerappa .......... G06F 16/215
2020/0004582 A1 * 1/2020 Fornash ................ G06F 9/4856

(56) References Cited

U.S. PATENT DOCUMENTS

2020/0012741 A1* 1/2020 Bracholdt ............. G06F 16/288
2020/0034461 A1* 1/2020 Sengupta .............. G06F 40/253
2020/0073989 A1* 3/2020 Valentin ................ G06F 16/248
2020/0097676 A1* 3/2020 Margel .................. G06F 21/316
2020/0104297 A1* 4/2020 Keskar .................. H04L 9/0637
2020/0117826 A1* 4/2020 Lilly, Jr. ........... G06F 16/24539
2020/0142983 A1* 5/2020 Williams ................ G06F 16/27
2020/0159851 A1* 5/2020 Madhavan ............ G06F 16/212
2020/0167323 A1* 5/2020 Swamy ................. G06F 16/256
2020/0175336 A1* 6/2020 Eberlein ............. G06F 11/3692
2020/0210478 A1* 7/2020 Wada .................... G06F 16/211
2020/0272750 A1* 8/2020 Hoeffer ................. G06F 21/604
2020/0349130 A1* 11/2020 Bracholdt ............. G06F 16/254
2020/0351091 A1* 11/2020 Gardner ................ H04L 9/3213
2021/0097194 A1* 4/2021 Khanduja ............. H04W 12/08
2021/0109912 A1* 4/2021 Biswas ................. G06F 21/602
2021/0109922 A1* 4/2021 Mahadik ............... G06F 3/0647
2021/0133349 A1* 5/2021 Jensen ................ G06F 21/6245
2021/0200744 A1* 7/2021 Gubba ................. G06F 16/258
2021/0224245 A1* 7/2021 Sharma ................. G06F 16/211
2021/0224412 A1* 7/2021 Dong ................... G06Q 10/105
2021/0318998 A1* 10/2021 Filip ..................... G06F 16/245
2021/0328789 A1* 10/2021 Hosur ................... H04L 9/0894
2022/0078224 A1* 3/2022 Saxena ............... H04L 41/0293
2022/0100715 A1* 3/2022 Lee ....................... G06F 16/258
2022/0100884 A1* 3/2022 Fink .................. G06F 16/24575
2022/0147536 A1* 5/2022 Kulkarni ............ G06Q 30/0201
2022/0222228 A1* 7/2022 Wang .................. G06F 16/2365
2022/0229929 A1* 7/2022 Kayyoor ............... G06F 16/245
2022/0229930 A1* 7/2022 Panikkar ............. G06F 21/6227
2022/0350916 A1* 11/2022 Sun ..................... G06F 21/6227
2022/0358235 A1* 11/2022 Gehtman ............ G06F 21/6218
2022/0405010 A1* 12/2022 Koike ................... G06F 3/0685
2023/0004669 A1* 1/2023 Langseth ............. G06F 16/258
2023/0058906 A1* 2/2023 Jansen ................ G06F 21/6254
2023/0058908 A1* 2/2023 Shaw .................... G06F 16/119
2023/0075443 A1* 3/2023 Senturk ................ G06F 16/245
2023/0093900 A1* 3/2023 Scope ................ G06F 21/6245 726/27
2023/0113635 A1* 4/2023 Borhade ............... G06F 16/215 707/692
2023/0136709 A1* 5/2023 Mellor .................. G06F 16/254 707/602
2023/0169092 A1* 6/2023 Mogaki ................. G06F 16/214 707/613
2023/0186025 A1* 6/2023 John ..................... G06F 16/243 704/9
2023/0252223 A1* 8/2023 Sanches ................ G06F 3/0481
2023/0259518 A1* 8/2023 Renick .................. G06F 16/254 707/602
2023/0267014 A1* 8/2023 Mouring, Jr. ......... G06F 9/5088 718/104
2023/0267225 A1* 8/2023 Costello .............. G06F 21/6227 726/27
2023/0281326 A1* 9/2023 Magalsky ........... G06F 21/6245 726/1
2023/0333767 A1* 10/2023 Macgaffey ............ H04L 67/568
2023/0334176 A1* 10/2023 Hajarian ............ G06F 21/6254
2023/0334237 A1* 10/2023 Frantz ..................... G06F 16/26
2023/0376623 A1* 11/2023 Zhang ................. G06F 21/6227
2024/0045884 A1* 2/2024 Lilko ...................... G06F 16/27
2024/0062197 A1* 2/2024 Carru ................. G06Q 20/3829
2024/0064017 A1* 2/2024 Lim ...................... H04L 9/0894
2024/0070321 A1* 2/2024 Minarik .............. G06F 21/6245
2024/0086407 A1* 3/2024 Franz .................. G06F 16/9024
2024/0086564 A1* 3/2024 Singh .................. G06F 21/6227
2024/0095064 A1* 3/2024 Mizuno ............... G06F 11/3409
2024/0134822 A1* 4/2024 Shaw .................. G06F 16/1824
2024/0134838 A1* 4/2024 Hong ...................... G06F 16/23
2024/0134850 A1* 4/2024 Xu .................... G06F 16/24522
2024/0134915 A1 4/2024 Zhang et al.
2024/0146526 A1* 5/2024 Schindewolf ......... H04L 9/0891
2024/0171586 A1* 5/2024 Jain ...................... H04L 63/105
2024/0195617 A1* 6/2024 Kim .................... G06F 16/2282
2024/0201854 A1* 6/2024 Kukita .................. G06F 3/0653
2024/0202203 A1 6/2024 Kostakis et al.
2024/0248809 A1* 7/2024 Kabeya ............... G06F 11/1464
2024/0303364 A1* 9/2024 Zhang ................. G06F 21/6227
2024/0330027 A1* 10/2024 Zeng ..................... G06F 16/213
2024/0330068 A1* 10/2024 Mardikar .............. G06F 9/5061
2024/0346172 A1* 10/2024 Kashiyama ......... G06F 21/6227
2025/0013773 A1* 1/2025 Kamyshenko ...... G06F 21/6245
2025/0053575 A1* 2/2025 Kobayashi .............. G06F 16/27
2025/0086196 A1* 3/2025 Maclean ................. G06F 16/26
2025/0131120 A1* 4/2025 Vorobyov ........... G06F 21/6227
2025/0147935 A1* 5/2025 Zhang ................. G06F 16/2358
2025/0190541 A1* 6/2025 Vemula ................. G06F 21/604
2025/0335626 A1* 10/2025 Blum .................. G06F 21/6245
2025/0378074 A1* 12/2025 Lee ................... G06F 16/24534
2026/0010523 A1* 1/2026 Xu ........................ G06F 16/219
2026/0050487 A1* 2/2026 Ford ..................... G06F 9/5077
2026/0050583 A1* 2/2026 Dang .................... G06F 16/211
2026/0050591 A1* 2/2026 Johnson ............ G06F 16/24522
2026/0087160 A1* 3/2026 Carru .................. G06F 21/6218
2026/0093916 A1* 4/2026 Loughran ............. G06F 40/274
2026/0111495 A1* 4/2026 Nethi .................. G06F 16/3331

* cited by examiner

FRAMEWORK FOR MIGRATION DATA DISCOVERY

BACKGROUND

An enterprise may use applications to perform various tasks. For example, an enterprise application might process functions associated with customer service, human resources, sales, etc. Typically, such applications were executed using an on-premises ("on-prem") computing environment (e.g., various servers, data stores, etc. were hosted on hardware local to the enterprise). Increasingly, however, enterprise applications and the data stores that support them, are migrating to a cloud-based computing environment (e.g., to reduce cost, improve availability, etc.) such as AMAZON® Web Services ("AWS"), Snowflake®, etc. Often many groups within the organization are migrating data from the on-premises environment to the cloud computing environment. Because enterprises often migrate large amounts of data, the migration may be scheduled to take place over a relatively long period of time. Due to the number of parties and duration involved, migration can be a time consuming and difficult task that often results in uncertainty about the migrated data (e.g., has the data been completely migrated, is there data loss, is there redundancy, etc.).

It would therefore be desirable to provide improved systems and methods to discover information about migrated data. Moreover, results should be easy to access, understand, interpret, update, etc.

SUMMARY OF THE INVENTION

According to some embodiments, systems and methods are provided to accurately and/or automatically identify which tables have been migrated to a cloud computing environment in a way that provides fast and useful results and that allows for flexibility and effectiveness when implementing those results.

Some embodiments are directed to a cloud migration data discovery framework implemented via a back-end application computer server. The cloud migration data discovery framework may include a data store that contains electronic records, each electronic record representing a schema, and including, for each schema, a schema identifier 114, one or more schema table names included in the schema, and at least one database object parameter; the back-end application computer server, coupled to the data store, including: a computer processor; and a computer memory, coupled to the computer processor, storing instructions that, when executed by the computer processor, cause the back-end application computer server to: receive a request for information about at least one table, the request including at least a requested table name; determine whether a corresponding table exists for the at least one requested table name, the determination based on a comparison of the requested table name to a first schema including the one or more schema table names; identify an access role in a case the corresponding table exists, wherein the corresponding table is accessible based in part on the access role; generate a view in response to the determination, wherein the view shows one of: a) a database, a schema and a table name for each table, in a case the corresponding table exists, or b) an indication the requested table name is not migrated to the cloud environment, in a case the corresponding table does not exist; and a communication port coupled to the back-end application computer server to facilitate a transmission of data with remote user devices to support interactive user interface displays, including the generated views, via a distributed communication network.

Some embodiments are directed to a method including receiving a request for information about at least one table, the request including at least a requested table name; determining whether a corresponding table exists for the at least one requested table name, the determination based on a comparison of the requested table name to a first schema including the one or more schema table names, wherein the schema represents tables migrated to a cloud computing environment; identifying an access role in a case the corresponding table exists, wherein the corresponding table is accessible based in part on the access role; and generating a view in response to the determination, wherein the view shows one of: a) a database, a schema and a table name for each table, in a case the corresponding table exists, or b) an indication the requested table name is not migrated to the cloud environment, in a case the corresponding table does not exist.

In some embodiments, a communication device associated with a back-end application computer server exchanges information with remote devices in connection with an interactive graphical interface. The information may be exchanged, for example, via public and/or proprietary communication networks.

A technical effect of some embodiments of the invention is an improved and computerized way to accurately and/or automatically identify which tables have been migrated to a cloud computing environment, along with their associated access roles, from an on-prem environment, in a way that provides fast and useful results. With these and other advantages and features that will become hereinafter apparent, a more complete understanding of the nature of the invention can be obtained by referring to the following detailed description and to the drawings appended hereto.

Figure 1:
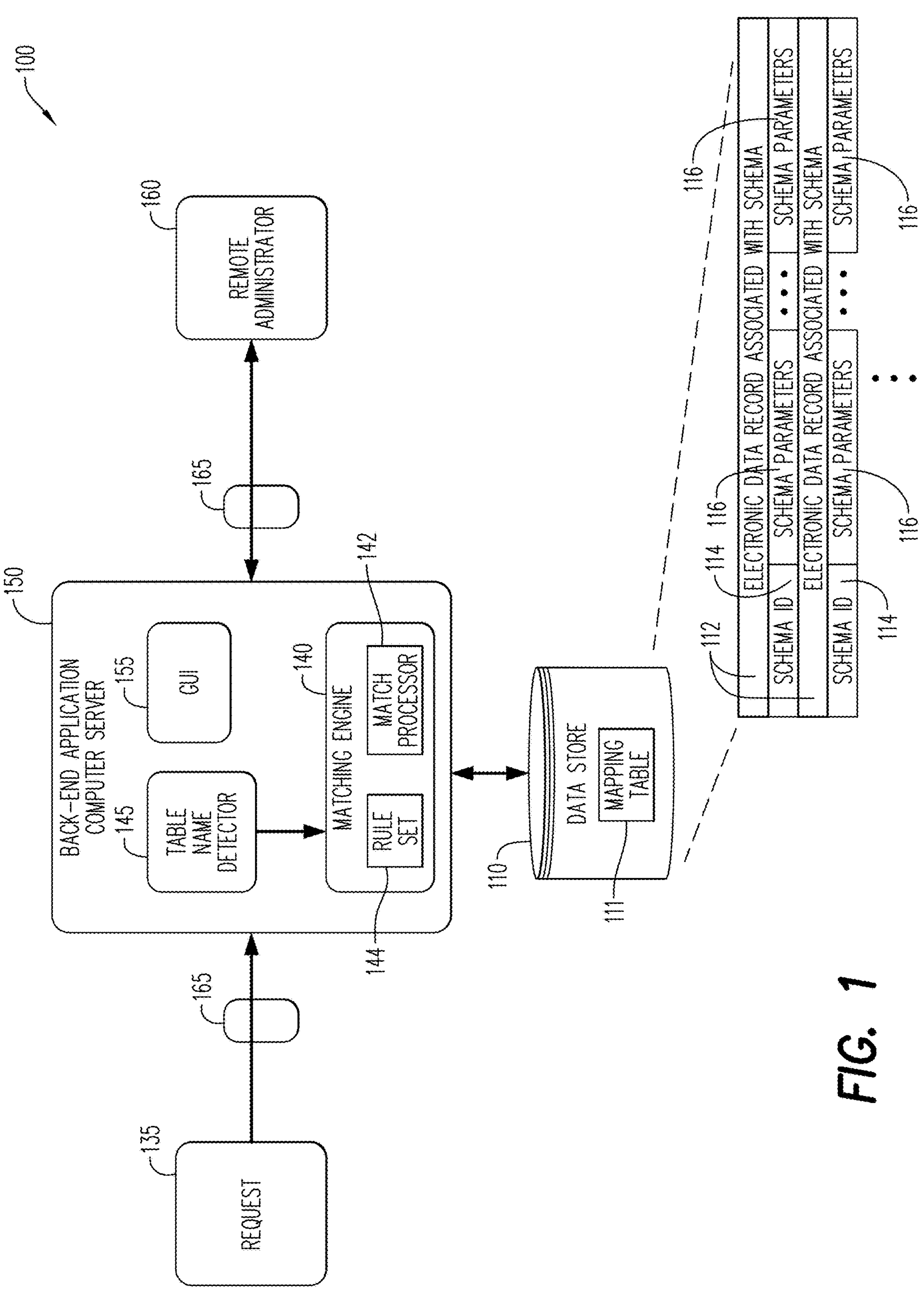
FIG. 1 is a high-level block diagram of a cloud migration data discovery framework in accordance with some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

The present invention provides significant technical improvements to facilitate data efficiency and usefulness associated with a cloud migration data discovery framework. The present invention is directed to more than merely a computer implementation of a routine or conventional activity previously known in the industry as it provides a specific advancement in the area of electronic record analysis by providing improvements in the operation of a computer system that facilitates the identification of tables already migrated to a cloud computing environment and access roles associated with the given table. The present invention provides improvement beyond a mere generic computer implementation as it involves the novel ordered combination of system elements and processes to provide improvements in the speed and ease of such data retrieval. Some embodiments of the present invention are directed to a system adapted to automatically identify on-demand the presence of a table in a cloud computing environment and the access roles associated with the table. Embodiments may return a response to a user in real-time and submit a request for access to the present tables to the appropriate party. Some embodiments of the present invention are directed to aggregate data from multiple data sources, to automatically optimize equipment information to reduce unnecessary messages or communications, etc. Moreover, communication links and messages may be automatically established, aggregated, formatted, exchanged, etc. to improve network performance (e.g., by reducing an amount of used network messaging bandwidth and/or storage required to implement such data retrieval, support technological updates, etc.). For example, embodiments may reduce storage requirements as duplicate tables are not stored in the cloud computing environment because users are able to discover whether the table is already migrated before they begin a migration process for a given table. As another example, embodiments reduce an amount of used network messaging bandwidth because the user submits a correct access request (i.e., correct table name and access role) the first time to the access requesting service, compared to the back and forth of messages in a case an incorrect access request is submitted. Used network messaging bandwidth is also reduced compared to conventional systems because users are able to independently determine whether data has been migrated unlike the conventional methods described herein.

As described above, often many groups within the organization are migrating data from the on-premises environment to the cloud computing environment. Because enterprises often migrate large amounts of data, the migration may be scheduled to take place over a relatively long period of time. Due to the number of parties and duration involved, migration can be a time consuming and difficult task. Each group may have different data, different locations of the data, data that references common data etc. and it is difficult for a user to determine: what data has already been migrated to the cloud computing environment, where that data is located, what the data is called, the cloud computing environment requirements to access the data (e.g., just because the user has on-premises access does not mean they have cloud computing environment access), etc.

Before a user can request access to data in the cloud computing environment, it is desirable for the user to determine whether the data has already been migrated to the cloud computing environment. Conventionally, some users were unable to search the cloud computing environment for data presence that was outside their access privileges. In these cases, the users would ask one or more colleagues whether the data was present in the cloud computing environment and the location of the data in the cloud computing environment. This conventional data presence process is particularly challenging for users working in different timezones, leading to increased wait times for a response from colleagues and therefore reduced productivity.

With respect to access, the cloud computing environment may require both a schema and an access role to receive information about data stored therein. In a case the appropriate access role is not included in a request, the user may be given incorrect information. For example, consider table X has an associated access role of Y. If a user requests information from the cloud computing system about table X and gives access role Z, the user receives a message that the table does not exist. A conventional access requesting service uses a ticketing system to provide schema for a particular access role request (e.g., for access role Y, the schema includes table X). However, the conventional access requesting service does not support the reverse operation, i.e., inputting a schema to retrieve the associated role (e.g., for schema with table X, the access role is Y). Messages may be transmitted back and forth between an access requesting service and the user until the user provides the correct access role associated with their desired data.

The inability to search for the existence of data in the cloud computing environment also results in redundant data being present in the cloud computing environment, as the same data may be migrated multiple times. The inability to easily determine if the data has already been migrated, results in a negative impact on the cloud computing resources.

To address these problems, the cloud migration data discovery framework provided by embodiments automatically and dynamically identifies the presence and location of data in the cloud computing environment on-demand and in real-time. Pursuant to embodiments, a user inputs at least a table name (and in some instances also a schema) of a table stored in an on-prem environment to the framework and the framework: 1. confirms whether the table has been migrated to the cloud computing environment, and 2. provides an access role for the table and/or schema. The user is then able to submit the access role and the table name in a request to the access requesting service for access to data within that given table. It is noted that in some embodiments, all of the tables in a schema are associated with a same access role, while in other embodiments, at least two tables included in the schema are associated with different access roles. Embodiments provide for a user to locate data independently on-demand and in real-time, without relying on colleague access. Embodiments provide an access role for a given schema, allowing a user to provide the correct access role and schema pairing to the access requesting service, resulting in approval of their access with a first request ticket (e.g., instead of making guesses and submitting a wrong ticket increasing message transmission). Embodiments also provide for a reduction of technology debt, as already-migrated data is identified, avoiding redundant migration and the associated expended resources.

FIG. 1 is a high-level block diagram of a cloud migration data discovery framework or system 100 according to some embodiments of the present invention. In particular, the system 100 includes a back-end application computer server 150 that may access information in data store 110 (e.g., storing a set of electronic records associated with a set of schemas 112, each record including, for example, one or more schema parameters 116 such as schema identifier, schema table name, column data type, access role, access privileges, etc. and associated values). A schema may refer to a collection of database objects, and defines how data is organized within a relational database. The definition is inclusive of logical constraints including but not limited to, table names, fields, data types and the relationships between these entities. The schema may include a subset of tables and other objects in a database. The schema provides database metadata including, but not limited to, table names, database names, data type of a column, access privileges, etc. The database objects hold data and may be tables or indexes that hold data or can consist of a definition only (e.g., a view or a synonym).

The back-end application computer server 150 may also exchange information with other data stores and utilize a Graphical User Interface ("GUI") 155 to view, analyze, and/or update the electronic records. The back-end application computer server 150 may also exchange information with a remote administrator platform 160 (e.g., via a firewall 165). In some embodiments, the remote administrator platform 160 may transmit annotated and/or updated information to the back-end application computer server 150. Based on the updated information, the back-end application computer server 150 may adjust data in the data store 110, and/or the change may be viewable via other remote administrator platforms. Note that the back-end application computer server 150 and/or any of the other devices and methods described herein might be associated with a third party, such as a vendor that performs a service for an enterprise.

Presentation of a user interface via the GUI 155 may include any degree or type of rendering, depending on the type of user interface code generated by the back-end application computer server 150. For example, a user (not shown) may execute a Web Browser to request and receive a Web page (e.g., in HTML format) from back-end application computer server 150 via HTTP, HTTPS, and/or WebSocket, and may render and present the Web page according to known protocols.

A matching engine 140 may receive a table name in a request 135. The matching engine 140 then searches for matches of the table name in a mapping table 111 populated, in part, with data from the electronic data records 112. The back-end application computer server 150 includes a table name detector 145. The table name detector 145 identifies the table name in the request 135. For example, the table name detector 145 may use a parser to identify the table name within the request. After the table name of the request is identified, the identified table name is automatically transferred to the matching engine 140. Subsequently, matches for the identified table name are searched for in the mapping table 111 by the matching engine 140. The matching engine 140 may include a match processor 142. The match processor 142 accesses a rule set 144. The search for matches can be based on the one or more rules in the rule set 144. The match processor 142 searches for matches of the requested table name in the mapping table 111 of the data store 110, and in particular for matches of the values in the schema table name parameter 116. The rules detail the circumstances for determining whether a match exists, and steps following a determination. For example, a match exists when the requested table name is the same text (e.g., exact match) as the schema table name. As another example, and pursuant to some embodiments, and described further below, the rules may be applied to identify a match candidate in a case that even if the table names have changed (e.g., abbreviated), they can still be found. As yet another example, the rules may be applied to identify a migrated table with only part of the table name in the request as a partial match candidate. The matching engine 140 may rank the match candidates and output the top matches. The top match candidates may be used as exact matches, as described further below.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources. A structured query language (SQL) script may be generated based on a request for data and forwarded to the data store 110. The data store 110 may execute the SQL script to return a result set based on data of the data store 110.

The back-end application computer server 150 may store information into and/or retrieve information from the data store 110. The data store 110 may be locally stored or reside remote from the back-end application computer server 150. As will be described further below, the data store 110 may be used by the back-end application computer server 150 to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and data store 110 might be co-located and/or may comprise a single apparatus and/or be implemented via a cloud-based computing environment.

The back-end application computer server 150 may be separated from or closely integrated with the data store 110. A closely-integrated server 150 may enable execution of services completely on the database platform, without the need for an additional server. For example, back-end application computer server 150 may provide a comprehensive set of embedded services which provide end-to-end support for Web-based applications. The services may include a lightweight web server, configurable support for Open Data Protocol, server-side JavaScript execution and access to SQL and SQLScript. The back-end application computer server 150 may provide application services (e.g., via functional libraries) using services that mange and query the database files stored in the data store 110. The application services can be used to expose the database data model, with its tables, views and database procedures, to clients. In addition to exposing the data model, the back-end application computer server 150 may host system services such as a search service, and the like.

The back-end application computer server 150 and/or the other elements of the system 100 might be, for example, associated with a Personal Computer ("PC"), laptop computer, tablet, smartphone, an enterprise server, a server farm, and/or a database or similar storage devices. According to some embodiments, an "automated" back-end application computer server 150 (and/or other elements of the system 100) may facilitate the automated access and/or update of electronic records. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Note that the system 100 of FIG. 1 is provided only as an example, and embodiments may be associated with additional elements or components. According to some embodiments, the elements of the system 100 automatically transmit information associated with an interactive user interface display over a distributed communication network.

Figure 2:
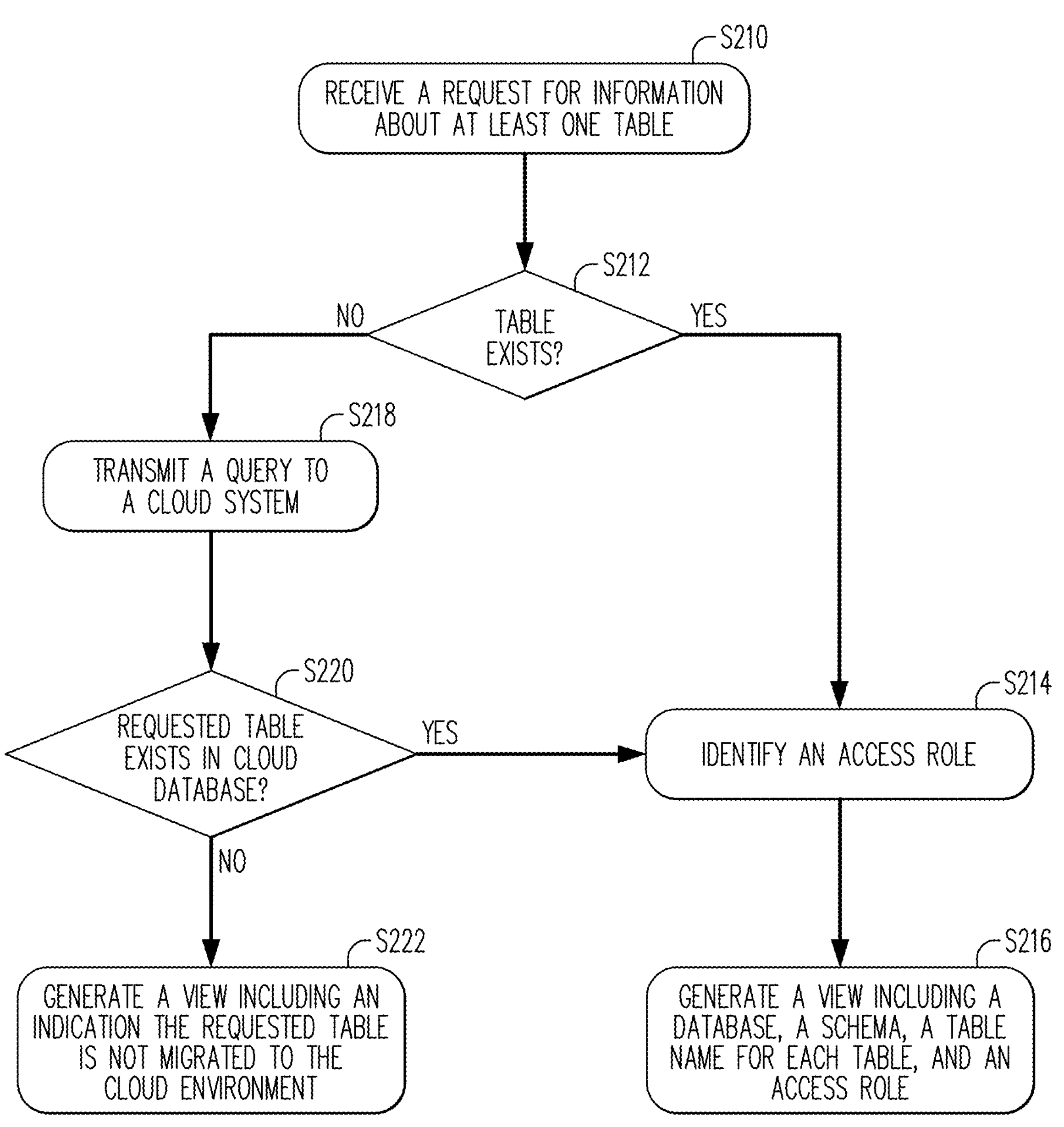
FIG. 2 illustrates a method in accordance with some embodiments.

FIG. 2 and illustrates a process 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

FIG. 2 comprises a flow diagram of a process 200 to determine whether an on-premise table has been migrated to the cloud computing environment by executing the back end application computer server according to some embodiments. Process 200 and other processes described herein may be performed using any suitable combination of hardware and software. Program code embodying these processes may be stored by any non-transitory tangible medium, including a fixed disk, a volatile or non-volatile random-access memory, a DVD, a Flash drive, or a magnetic tape, and executed by any one or more processing units, including but not limited to a processor, a processor core, and a processor thread. Embodiments are not limited to the examples described below.

Prior to the process 200, a mapping table 111 is generated recording the tables that have been migrated to the cloud computing environment from the on-prem environment. The mapping table 111 is generated based on information provided by the different groups in the enterprise, and the data records 112 stored in the data store 110, the information indicating data that has already been migrated to the cloud computing environment, the migrated table names, the cloud location of the migrated table, etc., and other metadata. The data included in the mapping table has 100% confidence score, indicating the system is 100% confident the data has been successfully migrated. The mapping table 111 includes database metadata like table name, database name data type for a given column, access privileges, access role, etc. The metadata of the mapping table 111 is used by the system 100 to discover the mapping of an on-premise table to a cloud computing table ("schema table").

Initially, at S210, a request 135 for information about at least one table is received. The information is indicative of whether the table, which is present in the on-prem environment, is also present in the cloud computing environment (e.g., the table has been migrated to the cloud computing environment). The request 135 includes a table name ("requested table name") for the on-premise table. The request 135 may also include an on-premise schema in which the on-premise table belongs. It is noted that one or more tables may be included in a same schema. When received at the back-end application computer server 150, the request 135 may also include other information including, but not limited to, a target table to search.

Figure 3:
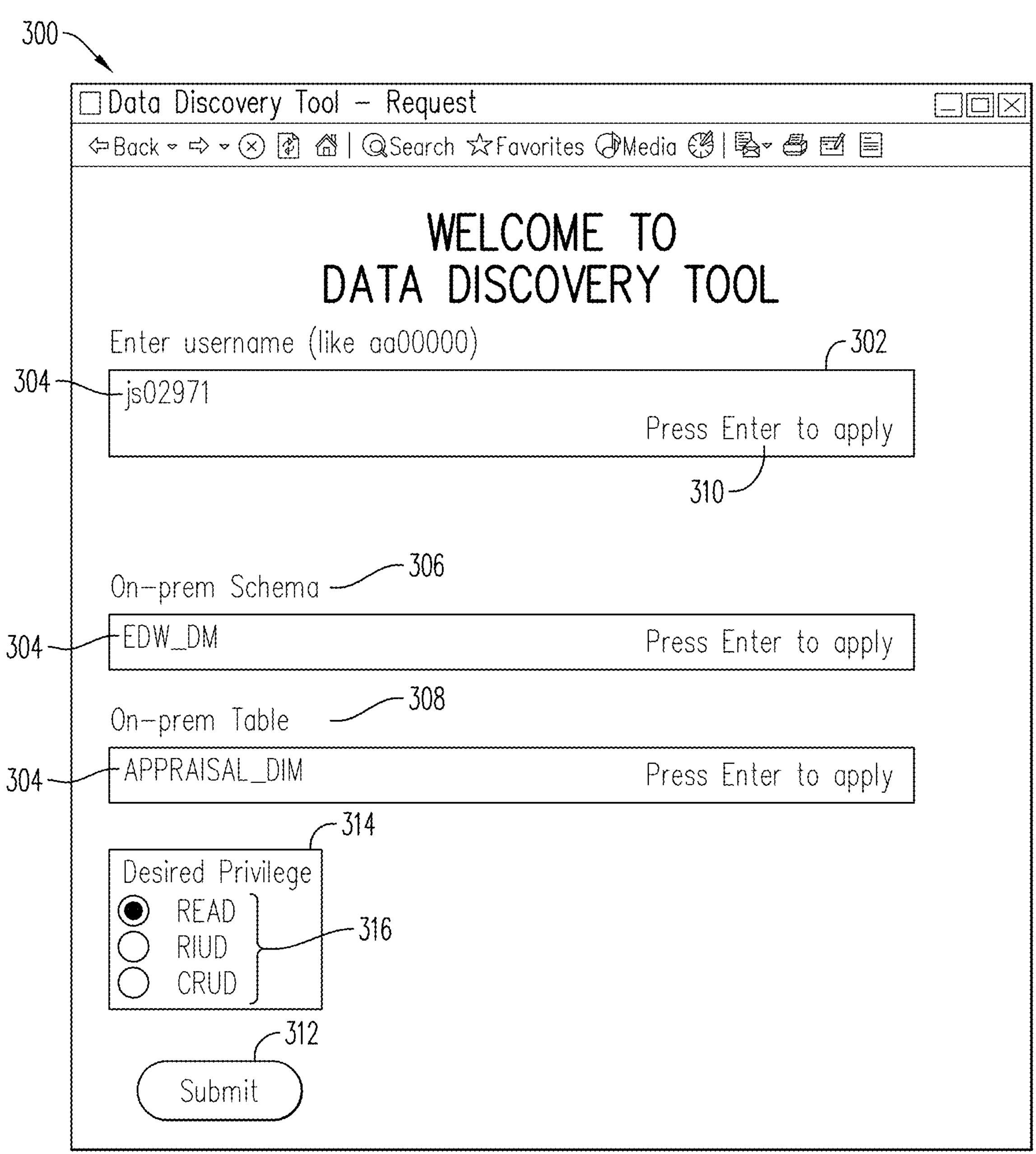
FIG. 3 is a data discovery user interface in accordance with some embodiments.

Prior to submission of the request 135, the user accessed a Data Discovery Tool display 300 via a Graphical User Interface ("GUI") 155, as shown in the non-exhaustive example of FIG. 3. The Data Discovery Tool display 300 includes graphical representation of elements according to some embodiments. Selection of (or entry in) a portion or element of the display 300, and other GUI displays described herein, via a touchscreen or pointer, may result in the presentation of additional information about that portion or element (e.g., a popup window presenting an explanation of the element; taking the user to another screen, etc.). Here, the display 300 includes a username element 302. The username element 302 may be a data entry field, as shown herein, or may be a drop-down menu, a static menu, or other suitable element. Pursuant to some embodiments, the username is not used to initiate an actual log-in process for the Data Discovery Tool, but rather to track the requests (e.g., who requested data, what data did they request, feedback about the data discovery process, etc.). The username is a same username to login to the enterprise platform. In this way, for example, the system 100 can map the value (e.g., username) 304 received in the username element 302 to the username in the enterprise platform, and then retrieve the contact information for that user from the enterprise platform. The contact information may then be used to contact the user via electronic mail, phone, video, etc. Here, the value is "js02971".

The display 300 also includes an On-prem Schema element 306 and an On-prem Table element 308. The On-prem Schema element 306 and the On-prem Table element 308 may be data entry fields. Here, the value 304 in the On-prem Schema element 306 is "EDW_DM" and the value 304 in the On-prem Table element 308 is "APPRAISAL_DIM". In one or more embodiments, inclusion of the On-prem Schema is not required in the request. The data entry fields may include additional instructions 310 for entry of the value. For example, here the data entry field includes an instruction 310 for the user to "press enter to apply" the entered value. It is noted that while the value is applied when "enter" is pressed, the request is not submitted until selection (e.g., via a cursor, touch screen, etc.), of the "submit" element 312.

The display 300 also includes a Desired Privilege element 314. The desired privilege is linked to the access role, such that the returned access role is based on the selected privilege. As a non-exhaustive example, for a given table name, an access role of "developer" is returned for a "CRUD" selected privilege, while an access role of "tester" is returned for a "READ" selected privileged. In the non-exhaustive example shown herein, the Desired Privileged element 314 includes radio buttons for the different selectable privileges 316 of the Desired Privilege element 314. Here, the selectable privileges 316 include a READ privilege, a RIUD privilege and CRUD privilege. Other selectable privileges may be included, and other elements (e.g., check boxes, data entry fields, highlighting, etc.) may be provided for selecting the privilege.

Turning back to the process 200, at S212, it is determined whether the requested table exists in the cloud computing environment. The table name detector 145 identifies the table name in the request 135, and transmits the table name to the matching engine 140. Execution of the matching engine 140 determines, via the match processor 142 and the rule set 144, whether there is a match among the schema table names for the requested table name in the mapping table 111. The matching engine 140 may analyze each character in each schema table name value and each requested table name to determine a match. As described above, a schema table name is considered a "match" for the requested table name in a case the names are the same. It is noted that often when a table is migrated from an on-prem environment to a cloud computing environment, the same name is used. However, in some instances, the table name may change due to character limit requirements (e.g., abbreviations), or other reasons. Pursuant to some embodiments, in a case the requested table name does not match a schema table name in the mapping table 111, the matching engine 140, via the match processor 142 and rule set 144, may identify every set of characters between underscores in a table name and compare the characters to an abbreviation library (not shown). In a case there is a translation of the characters in the library, the matching engine will replace the characters with the translation to generate a match candidate, and re-analyze each character in each schema table name value to determine whether there is a match. It is noted that the translation may work either way (e.g., CLM to CLAIM and CLAIM to CLM). It is also noted the matching engine 140 may identify more than one match candidate. In a case of more than one match candidate, the matching engine 140 may rank the candidates and re-analyze all of the candidates or only a top one or more candidates based on a given threshold. Pursuant to some embodiments, in a case the requested table name does not match a schema table name in the mapping table, the matching engine 140, via the match processor 142 and rule set 144, may perform a partial match search whereby only a certain portion of the table name included in the request is searched for. For example, the request may include a table name of "Sales_Order", and there is no matching schema table. The partial match search may identify any schema table name in the mapping table with the term "sales" as a match candidate and/or any schema table name in the mapping table with the term "order". As another example, consider a case where the user does not know the table name. In this case, less than all of a table name is included in the request, and the matching engine 140, via the match processor 142 and rule set 144, perform a partial match search whereby schema table names with the text in the request are identified as match candidates. In both partial match search cases, the matching engine 140 may identify match candidates for the partial match in the schema table names, and may also rank the match candidates, as described above. The matching engine 140 may further consider the match candidates as a match, and proceed as if they were a match, presenting the identified schema table names and access roles to the user. Pursuant to embodiments, in addition to abbreviations and partial matches, other suitable rules may be applied to identify the requested table name as having migrated in a case the requested table name does not match a schema table name in the mapping table.

In some embodiments, the matching engine 140 may end the analysis upon determining a first match, while in other embodiments, the matching engine 140 may end the analysis upon a review of the entire schema. The matching engine 140 may also end the analysis after a pre-determined amount of time or other stop point is reached.

In a case it is determined at S212 that there is a matching schema table name for the requested table name in the mapping table 111, an access role is identified at S214. The access role is a way to control access to data for users who belong to a group or domain. The access role may be a functional role (e.g., roles that perform a specific job function, like data scientist, data analyst, etc.) and may have an access privilege linked to that role. The access privilege includes a particular type of access to databases (e.g., Create Read Update Delete (CRUD), READ, etc.). Users are granted access roles to enable them to interact with objects (and associated values) in the system, such as tables and databases. As described above, in some embodiments, all of the tables in a schema are linked with a same access role, while in other embodiments, at least two tables included in the schema are linked with different access roles.

Figure 4:
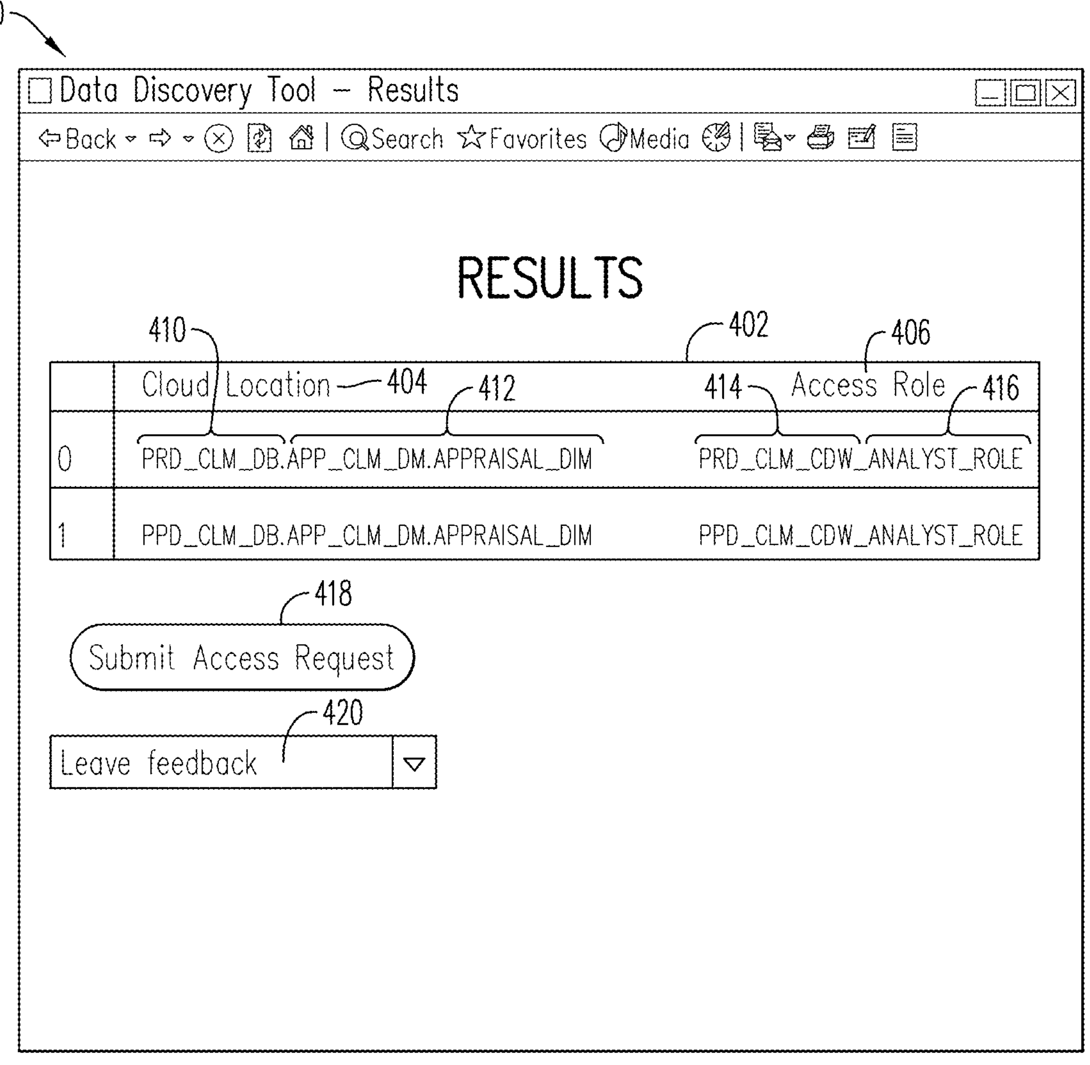
FIG. 4 is another data discovery user interface in accordance with some embodiments.

Then, in S216, a view (e.g., user interface) is generated including a database, a schema and a table name for each matched table. The view may be presented, via the GUI 155, as the Results display 400 as shown in FIG. 4. It is noted that while a separate UI is shown herein for the Results, in other embodiments the results may be generated on the initial UI in FIG. 3. The Results display 400 includes a results table 402. The results table 402 includes a cloud location parameter 404 and an access role parameter 406. A value 408 for each of the cloud location parameter and the access role is generated for each resulting matched table name. The cloud location value includes a database name 410 and the schema table name 412. The database name 410 may be followed by "DB". Here, there are two results for the matched table name ("APP_CLM_DM.APPRAISAL_DIM")—one in a pre-production (PPD) database and one in a production database (PRD). It is noted that a user may be interested in discovering the migration status of tables that have a same name. The access role value includes a source 414 of the access role and the access role name 416. Here, the source 414 is, respectively, the production CLM (claim) CDW (cloud data warehouse), and the pre-production CLM CDW. For both tables, the access role name 416 is "Analyst".

Figure 5:
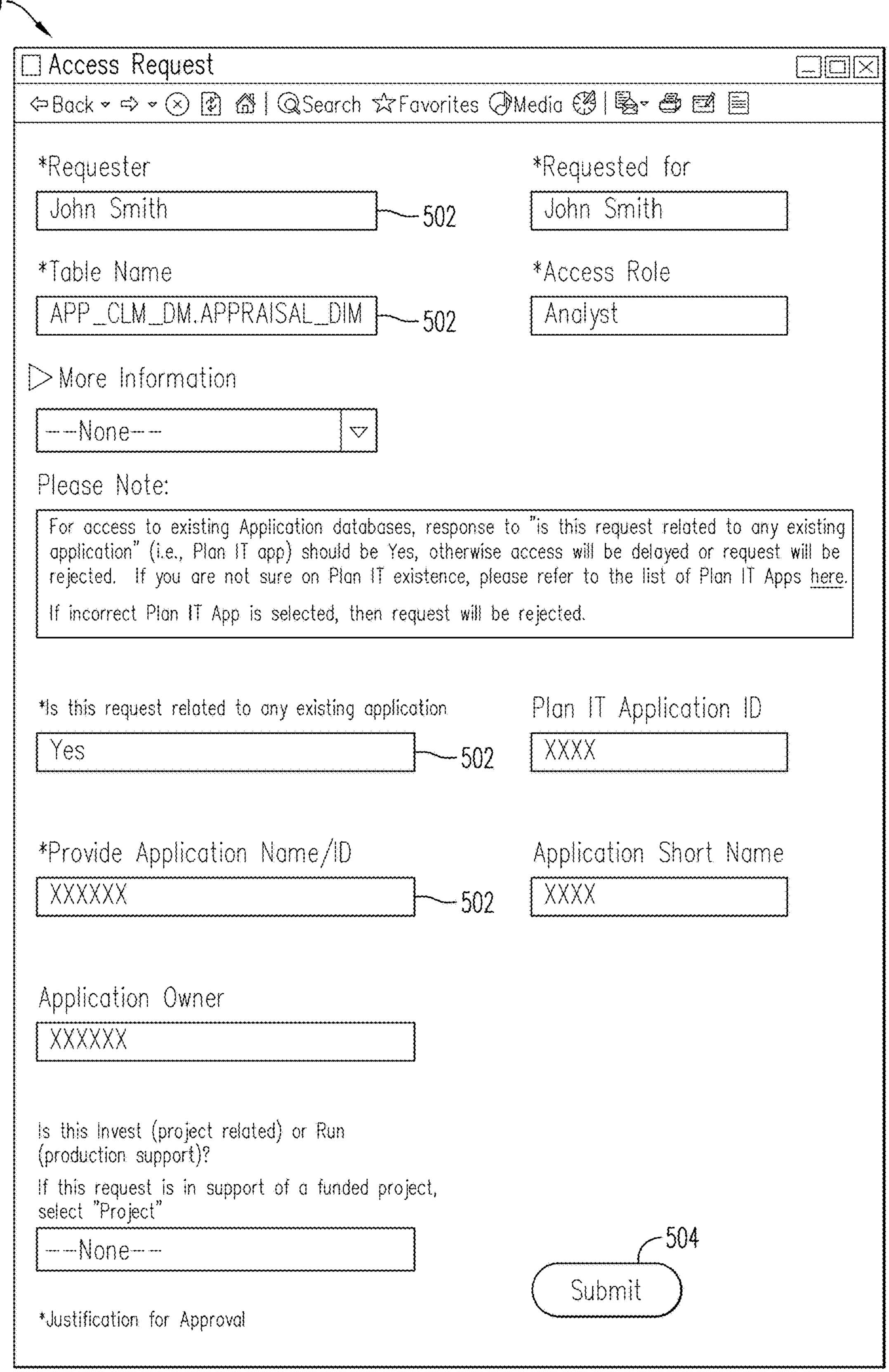
FIG. 5 is an access request user interface in accordance with some embodiments.

The Results display 400 also includes a "Submit Access Request" element 418. Selection of the "Submit Access Request" element 418 causes the back-end application computer server to connect the user to the Access Request display 500, shown in FIG. 5, provided by the access request tool of the access requesting service. The access requesting tool may be hosted in the on-prem environment or in the cloud computing environment. The back-end application computer server may pre-populate one or more fields 502 in the Access Request display 500 using results (e.g., schema table name) from the determination in S212. Here, the "Requester" field 502, Table Name field 502, and Access Role field 502 are pre-populated. Pursuant to some embodiments, the Access Request display 500 may use the username value from FIG. 3 to retrieve information for the user for pre-populating the fields 502 in the Access Request display 500. The Access Request display 500 includes other fields 502 including, but not limited to a "Requested for" field, a "User Type" field, a "Relation to an existing application" field, "Application name/id" field, "Application Owner", "Plan IT Application ID" field, "Application Short Name" field, and an "Invest or Run" field. Selection of the "Submit" element 504 submits the application form displayed per the Access Request display 500 to the access request tool.

Figure 6:
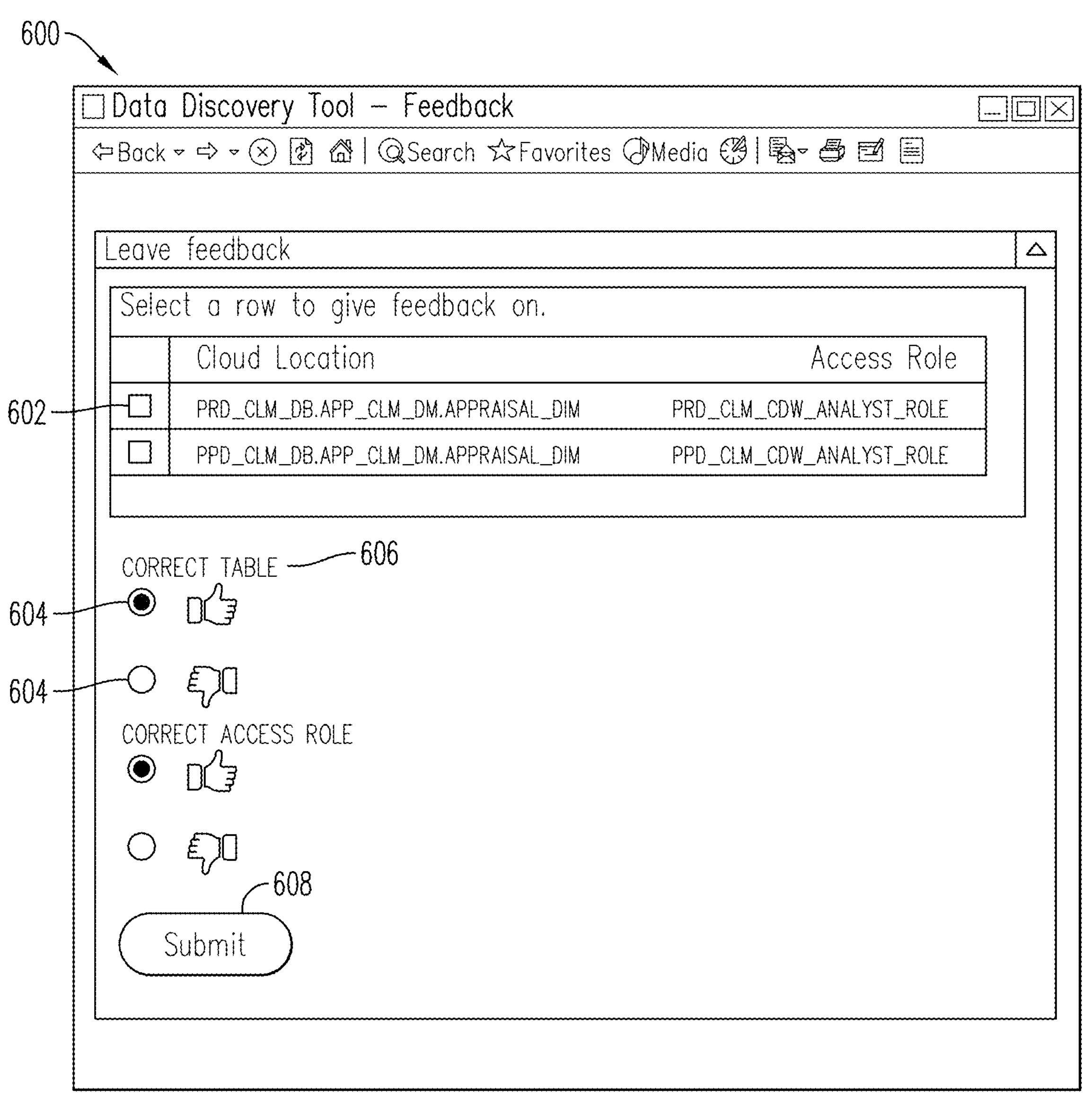
FIG. 6 is a feedback user interface in accordance with some embodiments.

The Results display 400 also includes a "Leave feedback" element 420. In response to selection of the "Leave feedback" element 420, the back-end application computer server 150, via GUI 155, displays a Feedback display 600 (FIG. 6). The Feedback display 600 includes the results table from FIG. 4, with each row including a selection element 602. Selection of the selection element 602 (here a checkbox), allows the user to provide feedback for the selected row. The feedback 604 may include feedback for one or more questions 606 related to the selected row. Here, the questions are: 1. Correct Table, and 2. Correct Access Role. Here, the feedback is provided via selection of a radio button representing a "thumbs up" icon and a "thumbs down" icon. The feedback may be provided in any suitable form. For example, text may replace icons, a drop-down menu of responses may be provided for selection of feedback, a free-form text field may be provided for receipt of feedback, etc. The Feedback display 600 also includes a "Submit" button 608 to submit the feedback.

Turning back to the process 200, in a case it is determined at S212 that there is no matching schema table name for the requested table name in the mapping table, a query is transmitted to a database at the cloud computing system in S218. The query includes the requested table name. Then it is determined at S220 whether the requested table name is in the database at the cloud computing system. The database at the cloud computing system returns a response indicating one of: the requested table name is present (e.g., exists) in the cloud computing environment or the requested table name is absent (e.g., does not exist) in the cloud computing environment. In a case the requested table name is in the database at the cloud computing system, the process returns to S214 and an access role is identified. In a case it is determined at S220 the requested table name is not in the database at the cloud computing system, the process 200 proceeds to S222 and a view (e.g., user interface) is generated. The view includes an indication the requested table has not been migrated to the cloud computing environment.

Figure 7:
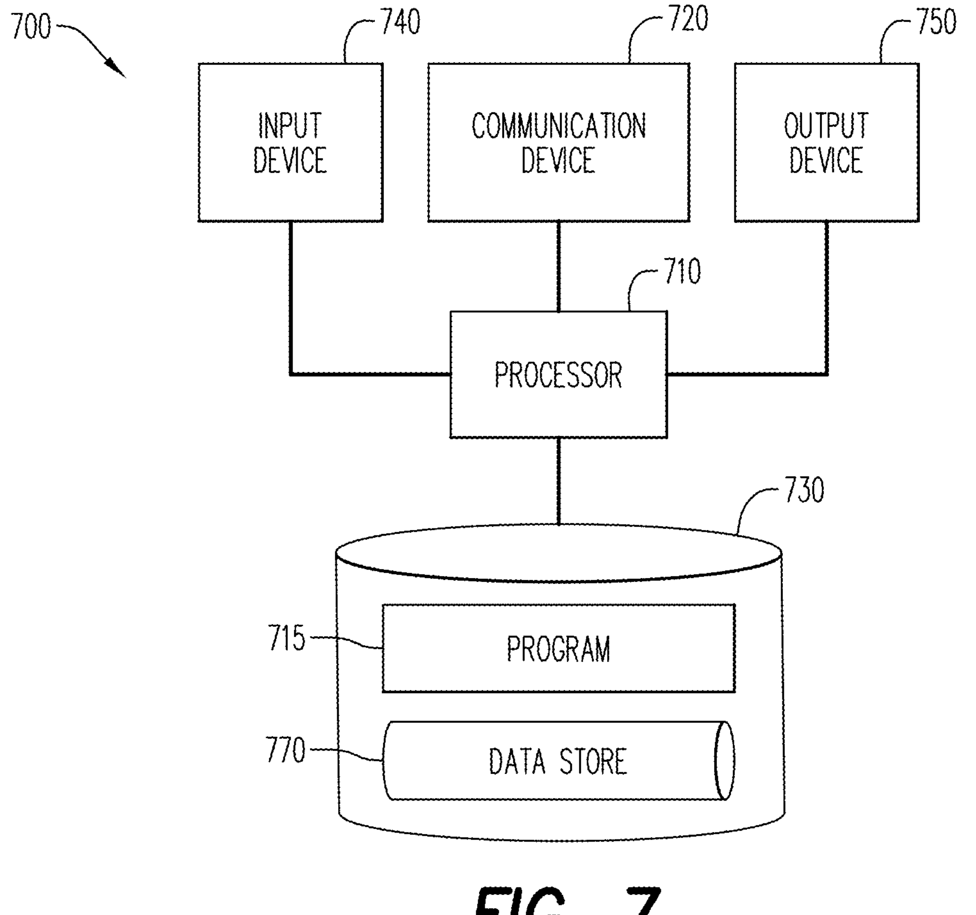
FIG. 7 is a block diagram of an apparatus or platform in accordance with some embodiments.

The embodiments described herein may be implemented using any number of different hardware configurations. For example, FIG. 7 illustrates an apparatus 700 that may be, for example, associated with system 100 described with respect to FIG. 1. The apparatus 700 comprises a processor 710, such as one or more commercially available Central Processing Units ("CPUs") in the form of one-chip microprocessors, coupled to a communication device 720 configured to communicate via a communication network (not shown in FIG. 7). The communication device 720 may be used to communicate, for example, with one or more remote third-party business or economic platforms, administrator computers, insurance agent, and/or communication devices (e.g., PCs and smartphones). Note that communications exchanged via the communication device 720 may utilize security features, such as those between a public internet user and an internal network of an insurance company and/or enterprise. The security features might be associated with, for example, web servers, firewalls, and/or PCI infrastructure. The apparatus 700 further includes an input device 740 (e.g., a mouse and/or keyboard to enter information about data sources, leave of absence data, third-parties, etc.) and an output device 750 (e.g., to output leave of absence plans, claim requests, etc.).

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 715 and/or an application for controlling the processor 710. The processor 710 performs instructions of the program 715, and thereby operates in accordance with any of the embodiments described herein. For example, the processor 710 may receive a request for a data table and, based on the system tools, automatically determines whether the data table has been migrated to the cloud computing environment and outputs the determination to the user.

The program 715 may be stored in a compressed, uncompiled and/or encrypted format. The program 715 may furthermore include other program elements, such as an operating system, a database management system, and/or device drivers used by the processor 710 to interface with peripheral devices.

As used herein, information may be "received" by or "transmitted" to, for example: (i) the apparatus 700 from another device; or (ii) a software application or module within the apparatus 700 from another software application, module, or any other source.

In some embodiments (such as shown in FIG. 7), the storage device 730 further includes a data store 770. An example of a database that might be used in connection with the apparatus 700 will now be described in detail with respect to FIG. 8. Note that the database described herein is only an example, and additional and/or different information may be stored therein. Moreover, various databases might be split or combined in accordance with any of the embodiments described herein. For example, the data store 770 and might be combined and/or linked to each other within the program 715.

Figure 8:
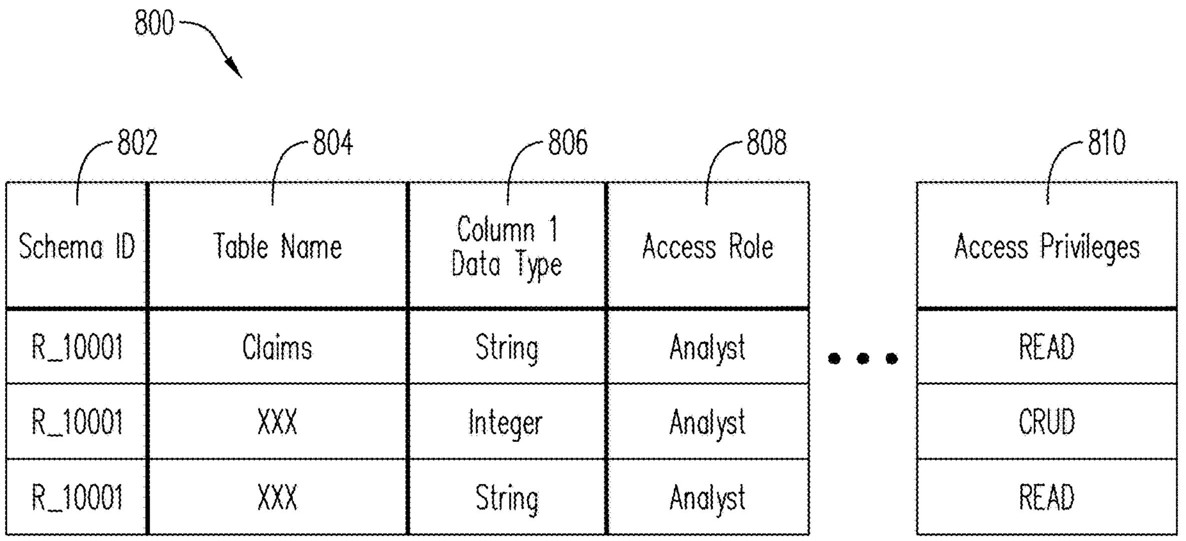
FIG. 8 is a portion of a data store in accordance with some embodiments.

Referring to FIG. 8, a table is shown that represents the data store 800 that may be stored at the apparatus 700 according to some embodiments. The table may include, for example, entries associated with on-premise tables that have been migrated to the cloud-computing environment. The table may also define fields 802, 804, 806, 808, 810 for each of the entries. The fields, 802, 804, 806, 808, 810 may, according to some embodiments, specify: a schema identifier 802, a table name 804, a column 1 data type 806, an access role 808 and an access privilege 810. The data store 800 may be created and updated, for example, based on information electrically received from various data sources (e.g., including when a new table is migrated to the cloud computing environment) that are associated with a business such as an insurance provider. In some embodiments, in response to a table being migrated to the cloud computing environment, a new entry is automatically added to the mapping table.

The schema identifier 802 may be, for example, a unique alphanumeric code associated with the schema for the already-migrated tables. The table name 804 may indicate the name of the already-migrated table included in the schema. The column 1 data type 806 may indicate the type of data (e.g., string, integer, etc.) in the first column of the table. The access role 808 may indicate the access role associated with the schema and table name. The access privilege 810 may indicate the access privileges (e.g., read only, create, read, update, delete, etc.) associated with a particular access role for a particular schema/table name.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 9:
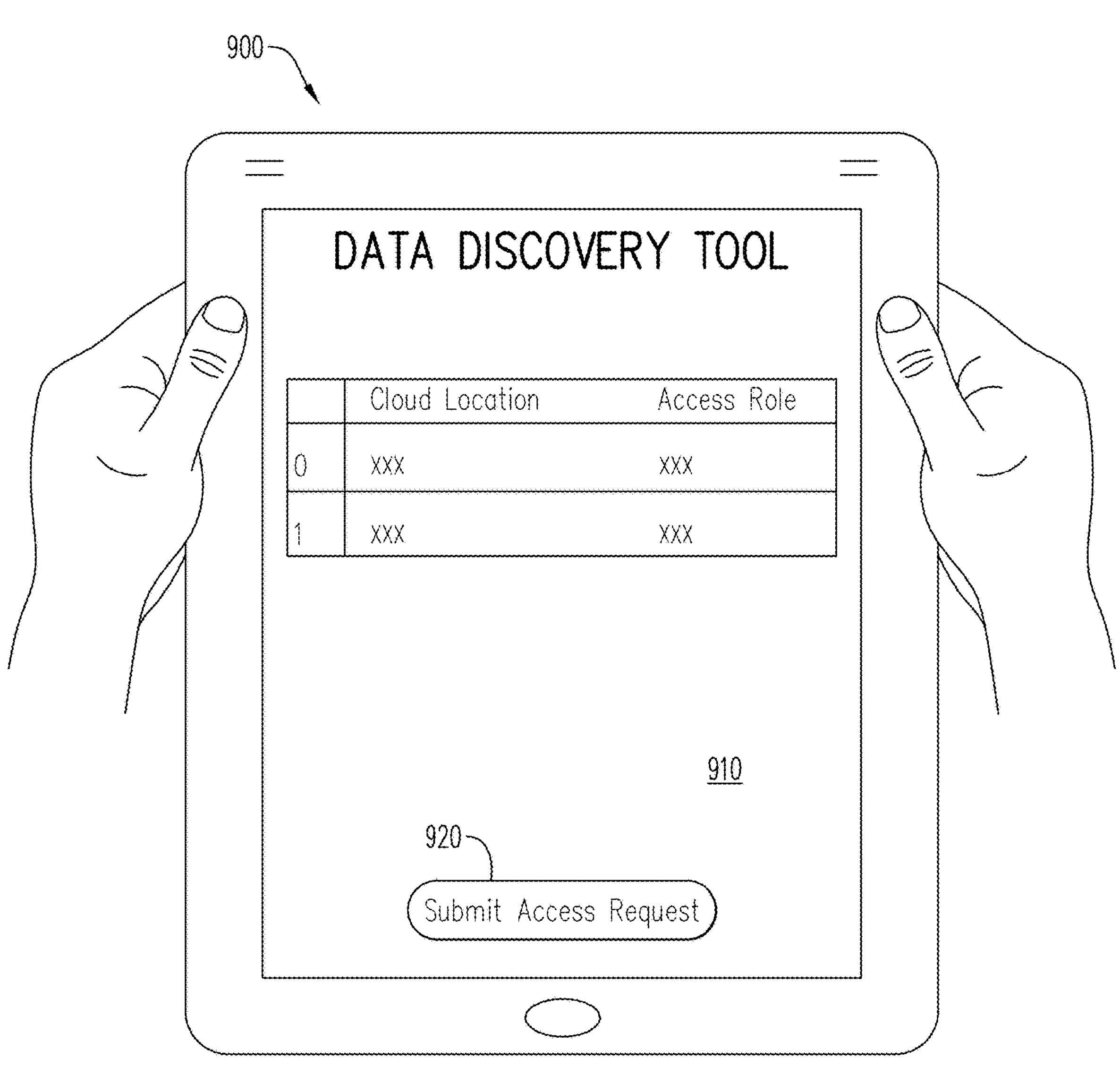
FIG. 9 illustrates a tablet computer display in accordance with some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of entities, embodiments may instead be associated with other types of businesses in addition to and/or instead of those described herein (e.g., financial institutions, universities, governmental departments, any organization migrating a lot of data). Similarly, although certain types of certain attributes were described in connection with some embodiments herein, other types of attributes may be used instead. Still further, the displays and devices illustrated herein are only provided as examples, and embodiments may be associated with any other types of user interfaces. For example, FIG. 9 illustrates a tablet computer 900 with a Results display 910 according to some embodiments. The display 910 includes the matched tables. Selection of the "Submit Access Request" icon 920 might result in transmission of an access request, as described above.

The present invention has been described in terms of several embodiments solely for the purpose of illustration. Persons skilled in the art will recognize from this description that the invention is not limited to the embodiments described but may be practiced with modifications and alterations limited only by the spirit and score of the appended claims.

What is claimed is:

1. A cloud migration data discovery system implemented via a back-end application computer server, comprising:
- a data store that contains electronic records, each electronic record representing a schema, and including, for each schema, a schema identifier, one or more schema table names included in the schema, and at least one database object parameter;
- the back-end application computer server, coupled to the data store, including:
  - a computer processor; and
  - a computer memory, coupled to the computer processor, storing instructions that, when executed by the computer processor, cause the back-end application computer server to:
    - receive a request for information about at least one table, the request including at least a requested table name;
    - determine whether a corresponding table exists for the at least one requested table name, the determination based on a comparison of the requested table name to a first schema including the one or more schema table names;
    - identify an access role in a case the corresponding table exists, wherein the corresponding table is accessible based in part on the access role;
    - generate a view in response to the determination, wherein the view shows one of:
      - a) a database, a schema and a table name for each table, in a case the corresponding table exists, or
      - b) an indication the requested table name is not migrated to a cloud computing environment, in a case the corresponding table does not exist; and
- a communication port coupled to the back-end application computer server to facilitate a transmission of data with remote user devices to support interactive user interface displays, including the generated views, via a distributed communication network.

2. The system of claim 1, wherein the schema represents tables migrated to a cloud computing environment.

3. The system of claim 2, further comprising instructions to, prior to generation of the view:
- in a case the requested table name is not present in the first schema, transmit a query to the cloud computing environment, the query including the requested table name;
- receive a response from the cloud computing environment, the response indicating one of: the requested table name is present in the cloud computing environment or the requested table name is absent from the cloud computing environment; and
- generate the view.

4. The system of claim 1, wherein the determination the corresponding table exists is based on a match between the requested table name and the schema table name.

5. The system of claim 4, wherein the match is a same text in both the requested table name and the schema table name.

6. The system of claim 1, wherein the determination the corresponding table exists further comprises instructions to:
- determine the requested table name does not match the schema table name;
- identify an abbreviation in one of the requested table name and the schema table name;
- translate the abbreviation;
- generate a match candidate by replacing the abbreviation with the translation; and
- determine the match candidate matches one of the requested table name or the schema table name.

7. The system of claim 1, wherein the determination the corresponding table exists further comprises instructions to:
- perform a partial match search.

8. The system of claim 1, wherein the access role is linked to the schema table name.

9. The system of claim 8, wherein access provided by the access role is access for every table in the schema.

10. The system of claim 8, the access role grants at least one of read, create, update, delete and use privileges.

11. A computer-implemented method comprising:

receiving a request for information about at least one table, the request including at least a requested table name;

determining whether a corresponding table exists for the at least one requested table name, the determination based on a comparison of the requested table name to a first schema including one or more schema table names, wherein the schema represents tables migrated to a cloud computing environment;

identifying an access role in a case the corresponding table exists, wherein the corresponding table is accessible based in part on the access role; and generating a view in response to the determination, wherein the view shows one of:

a) a database, a schema and a table name for each table, in a case the corresponding table exists, or b) an indication the requested table name is not migrated to the cloud environment, in a case the corresponding table does not exist.

12. The method of claim 11, further comprising, prior to generation of the view:

in a case the requested table name is not present in the first schema, transmitting a query to the cloud computing environment, the query including the requested table name;

receiving a response from the cloud computing environment, the response indicating one of: the requested table name is present in the cloud computing environment or the requested table name is absent from the cloud computing environment; and generate the view.

13. The method of claim 11, wherein the determination the corresponding table exists is based on a match between the requested table name and the schema table name.

14. The method of claim 11, wherein the determination the corresponding table exists further comprises:

determining the requested table name does not match the schema table name;

identifying an abbreviation in one of the requested table name and the schema table name;

translating the abbreviation;

generating a match candidate by replacing the abbreviation with the translation; and determining the match candidate matches one of the requested table name or the schema table name.

15. The method of claim 11, wherein the determination the corresponding table exists further comprises:

performing a partial match search.

16. The method of claim 11, wherein the access role is linked to the schema table name.

17. The method of claim 16, the access role grants at least one of read, create, update, delete modify and use privileges.

18. One or more non-transitory computer-readable media storing program code that, when executed by a computing system, causes the computing system to perform operations comprising:

receiving a request for information about at least one table, the request including at least a requested table name;

determining whether a corresponding table exists for the at least one requested table name, the determination based on a comparison of the requested table name to a first schema including the one or more schema table names, wherein the schema represents tables migrated to a cloud computing environment;

identifying an access role in a case the corresponding table exists, wherein the corresponding table is accessible based in part on the access role; and generating a view in response to the determination, wherein the view shows one of:

a) a database, a schema and a table name for each table, in a case the corresponding table exists, or b) an indication the requested table name is not migrated to the cloud environment, in a case the corresponding table does not exist.

19. The media of claim 18, further comprising, prior to generation of the view:

in a case the requested table name is not present in the first schema, transmitting a query to the cloud computing environment, the query including the requested table name;

receiving a response from the cloud computing environment, the response indicating one of: the requested table name is present in the cloud computing environment or the requested table name is absent from the cloud computing environment; and generate the view.

20. The media of claim 18, wherein the determination the corresponding table exists is based on a match between the requested table name and the schema table name.

* * * * *